Figure 8:
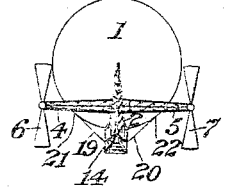

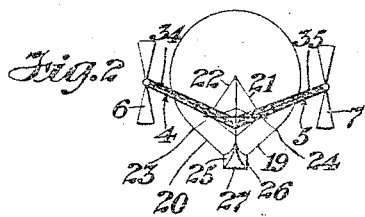
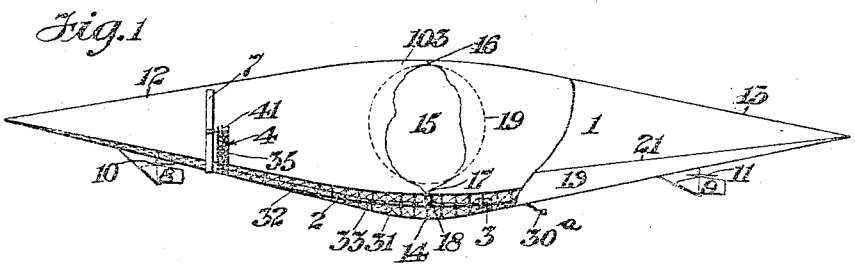
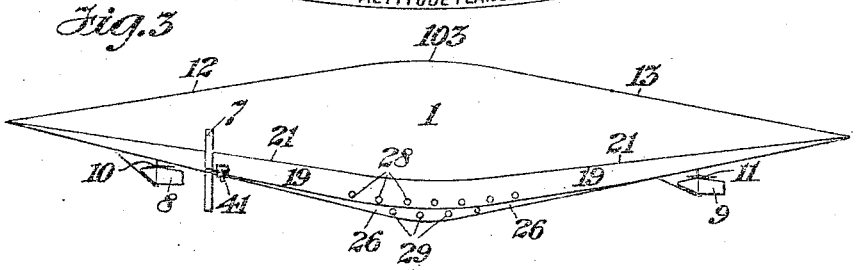
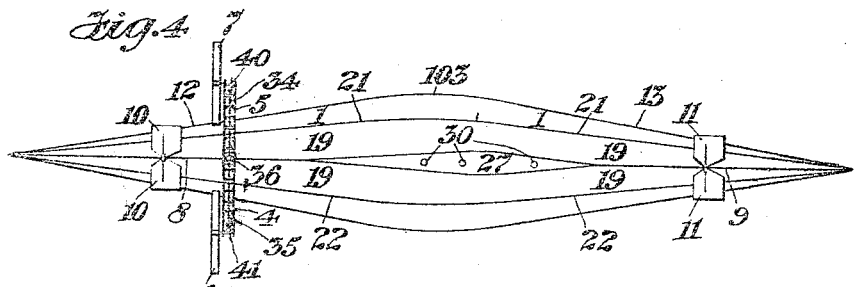

P. C. HEWITT.
BALLOON AND ANALOGOUS DEVICE.
APPLICATION FILED APR. 21, 1908.

1,134,386.

Patented Apr. 6, 1915.
5 SHEETS—SHEET 2.

WITNESSES:

INVENTOR
Peter Cooper Hewitt
BY
George C. Dean
ATTORNEY

P. C. HEWITT.
BALLOON AND ANALOGOUS DEVICE.
APPLICATION FILED APR. 21, 1905.
1,134,386.
Patented Apr. 6, 1915.
5 SHEETS—SHEET 3.
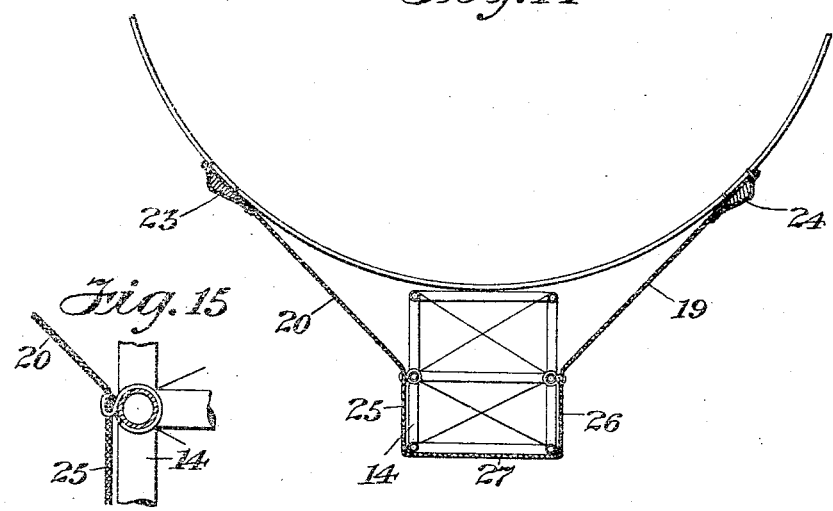
Fig. 14
Fig. 15
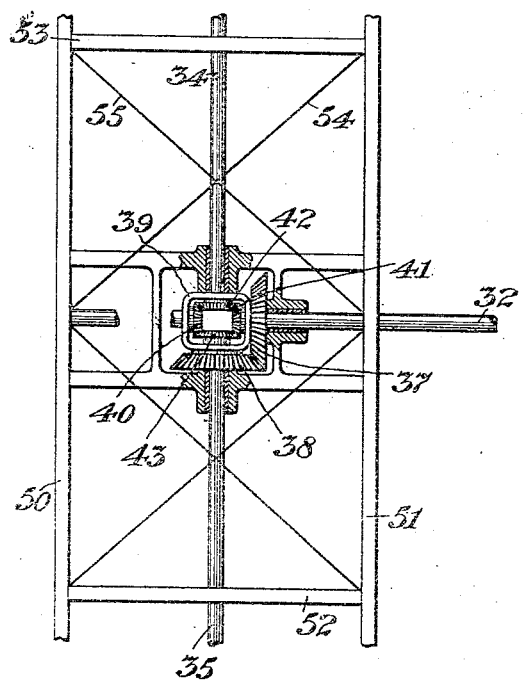
Fig. 10
WITNESSES
Chas. J. Clagett
C. M. Carpenter
Peter Cooper Hewitt INVENTOR
BY
G. C. Allan ATTORNEY

P. C. HEWITT.
BALLOON AND ANALOGOUS DEVICE.
APPLICATION FILED APR. 21, 1908.

1,134,386.

Patented Apr. 6, 1915.
5 SHEETS—SHEET 5.

WITNESSES:

INVENTOR
Peter Cooper Hewitt,
BY
George C. Klumm
ATTORNEY

UNITED STATES PATENT OFFICE.

PETER COOPER HEWITT, OF RINGWOOD MANOR, NEW JERSEY.

BALLOON AND ANALOGOUS DEVICE.

1,134,386.   Specification of Letters Patent.   Patented Apr. 6, 1915.

Application filed April 21, 1908. Serial No. 428,302.

*To all whom it may concern:*

Be it known that I, PETER COOPER HEWITT, a citizen of the United States, and a resident of Ringwood Manor, in the county of Passaic and State of New Jersey, have invented certain new and useful Improvements Relating to Balloons and Analogous Devices, of which the following is a specification.

My present invention includes improvements adapted for air craft of the type in which a body of gas lighter than air is utilized to sustain an appreciable proportion of the weight of the craft, and although certain features of my invention may be utilized in connection with other bodies intended for movement at high speed through a fluid medium, the specific object in view has been the production of a high speed motor balloon.

In the prior art, the total pressures on the head have been reduced and the structures adapted for somewhat higher speeds, by decreasing the maximum cross-section for a given volume with due regard for minimum increase of surface and skin friction. Development along these lines has resulted in elongated structure, the front ends or bows of which are commonly formed on lines of spheroids or convexed cones round at the ends. This has tended to reduce the total pressure on the head for a structure of given volume, but it has not reduced the effective pressures on certain portions of the surface, and such devices have not been made with reference to the support of the external pressure by a minimum internal pressure, nor have they been constructed with regard to a minimum pressure per unit area, particularly the forward surfaces which first engage the air. Consequently, when supported only by a uniform pressure of gas within the envelop, certain portions of the surface may yield, so that the structure may become deformed at comparatively low speeds, whereas, if made according to my invention, with the area and shape made such as to properly distribute the external pressure, such local excess of stress would not occur. Where distortion or deformation is once initiated at the forward end of the bow, the deforming pressure becomes progressively greater per unit area because of the more effective angle of impingement of the air, and the deforming or distorting effects progress proportionately, and if this occurs at high speeds, it may be very dangerous in a variety of ways.

The speed which may be attained before undesirable effects will be developed, can be increased to a certain extent by increasing the structural strength or the internal gas pressure, and I may avail myself of any such expedients, but one of the objects of my invention is to increase the effectiveness of any given internal pressure or strength available for support of the surface, so that the surface will withstand the pressure due to a greater speed, by reason of the pressure being substantially uniform per unit area. I accomplish this by proportioning the area and shape of the surfaces of the head so that the pressure on any one portion of the deflecting surface shall be as nearly equal to that on any other portion as may be desired, and preferably shall nowhere exceed a permissible value per unit area. Where the internal support is afforded by a gas under pressure, this permissible value is determined by the strength of the material of the gas bag and the permissible pressure with reference to loss of gas through leakage, and one of the most practical applications of my invention involves supporting a given external pressure by a minimum internal pressure of the gas in order to keep down the leakage. With these objects in view, the length, maximum cross-section, and ratio of decrease of adjacent cross-sections of the structure are determined by the extent to which the reactions and effective pressures per unit area must be distributed for the purpose in view. The important fact is that by considering the problem from the standpoint of permissible pressure per unit area, instead of from the standpoint of minimum total resistance, and by suitably distributing the head pressure by suitably proportioning the area and shape of the surfaces, I increase the speed at which a structure of given internal pressure or strength may be driven without deformation, and thereby greatly increase the effectiveness and safety of the device.

In actual practice, the dimensions, areas, and contours may be worked out, either on the basis of a given permissible supporting strength for the surfaces of the structure, or on the basis of a given head resistance to be supported; that is to say, my principle may be applied either in the direction of utilizing a given supporting strength in the best possible way, so that the surfaces may be able to withstand as high a speed as possible, or in the direction of getting the least supporting strength necessary for a given speed to be attained.

I contemplate special areas and contours for the moving body as a whole, and especially for the forwardly directed surfaces or head portion. As the matter of pressure per unit area on the head portion is of great importance, regardless of what may be the shape of the body portion, the head may be considered separately, assuming as to the body portion only that it has a cross-section of a given area and a fairly regular outline.

The air piercing portion of the forwardly projecting member or head, particularly portions thereof nearest the apex, are preferably of sufficiently regular cross-section so that the lateral components of the head resistance are practically balanced. This minimizes any tendency to lateral bending or whipping out of alinement. Preferably, the axis of the head is arranged in alinement with the center of resistance.

The pressure on any unit area may be further decreased for a given length by giving the head a longitudinal contour such that the work of displacing the fluid medium is not concentrated upon the tip or extreme forward portion. To this end I prefer to make the longitudinal contour such that the air is displaced out of the path of movement of the balloon, as if by the action of constant force per unit area, the head pressure being distributed with approximate uniformity over the forward portion of the deflecting surfaces. This is an improvement, independently of whether the head be short or long, or the pressure per unit area, correspondingly large or small. The longitudinal taper of the head necessary to accomplish this does not depart much from that of converging straight lines as in a cone. In most cases the departure from such contour, if any, should be in the direction of longitudinally concaving the surface thereof, as by thinning or elongating the forward end or by swelling the diameter of the base. A cone of any pitch will start the air from a state of rest at the tip of the cone and the diverging sides thereof will move the air the distance necessary to permit the passage of the moving body, and to that extent, any cone or concaved cone is preferable to a longitudinally convexed formation. My invention thus contemplates increasing the effectiveness of the available internal pressure or supporting strength by utilization of three factors; namely, increase of deflecting surface; decrease of deflecting angle; and uniform distribution of the effort over the deflecting area. One of these factors may be given more prominence than the other, but preferably all are conjointly utilized to produce such approximation of uniform distribution of head pressure as may be necessary to effect the desired decrease of distorting effort on any given portion of the area. In general, however, the length of the head will be greater and the pitch of the deflecting surfaces smaller, proportionally as the high speed limit is increased, but in practice, elongation involves relative decrease of cross-section and the lengthening or thinning down toward the tip should not be greater than is necessary to bring the pressure per unit area down to that which the structure can safely support.

When not otherwise limited by practical considerations of construction, I prefer to make the contour such that the deforming effort will be somewhat greater on the rearward portions, where the cross-section is greater, than it is on the portions adjacent the tip. This may be accomplished by making the angles of the surfaces from the tip rearwardly of such pitch that the effective pressures per unit area are somewhat greater on those portions of the arc which are distant from the tip. A comparatively slight inward movement of the walls at this region of greater diameter will effect a relatively great decrease in the volume of the gas, and in the deflecting angle of the surfaces. This will tend to maintain the internal pressure and at the same time to decrease the effective external pressure at that point, and both changes will tend to maintain the shape of the air piercing apex for a considerable time, even in the case of a bad leak.

It is undesirable to move the air at higher velocities and to radial distances greater than necessary to permit the passage of the main body of the balloon. The air piercing member will do this if too blunt for the speed attained, even though it be formed as a cone or as a longitudinally concaved cone, and one part of my invention involves forming the gas envelop or other moving body from the base of the cone to the plane of maximum diameter in proper correlation to the velocities imparted to the air by the head, so that the air will lose its energy and reach a state of rest when it has moved outwardly a distance equal to the maximum radius of the moving body. Desirable longitudinal contours for this part of the surface, where the air is losing its radial velocity and coming to a state of rest, depart but little from the arcs of circles of large radius having the divergent surfaces of the cone approximately tangent thereto. By this construction and proportion, the air from a state of rest is moved outwardly, and energy delivered to it proportional to the length from the tip, and allowed gradually to come to a state of rest by the time it reaches the plane of maximum cross-section of the advancing body.

A balloon envelop or other body, when properly shaped for a given speed in accordance with the above principles, will always operate satisfactorily for any lower speed. For my purposes, it is desirable to design the lengths and pitch of deflecting surfaces in accordance with the principles herein above laid down for the head or piercing member, and then to make the body portion of such curvature with respect to the falling velocity of air as will allow it to gradually come to rest after having been displaced at the maximum speed for which the head or piercing member is designed.

The precise areas and contours of the convergence of the body rearwardly of its maximum diameter are not so important as those of the bow, since the energy absorbed by the air at the time of radial displacement at the bow may be restored by the inward movement and pressure of the air as it closes in upon the stern. It is important, however, that the stern or tail be given such shape that the air moving inward shall press radially upon the surface of the tail, so that it may restore as much as possible of the energy stored in it and be left in a state of rest. Where the structure forward of the maximum cross-section has been properly designed, as hereinbefore indicated, this may be accomplished by making the rear portion and the forward portion approximately symmetrical with respect to the plane of the major transverse section, though, if desired, the rear portion may be lengthened out to a greater distance than the bow, or may be made short. With this design the balloon requires no structural compression member, the internal pressure of the gas from bow to stern being sufficient to transfer back to the bow the energy restored at the stern.

In the preferred embodiment of my invention, the front and rear portions are equal and symmetrical with respect to a central transverse plane of maximum diameter and the longitudinal contour approximates that of two cones jointed base to base by a body portion following the arcs of circles having the sizes of the cones as tangents, the radii of said circles being preferably greater than the radius of the base of the cone. A radius equal to three or four diameters of the base of the cone will prove satisfactory in many cases. The ratios of length to diameters are determined by the permissible internal pressure of the gas and by the maximum speed to be attained, subject to the limitations imposed by other practical requirements.

For most practical purposes, the desirable deflecting angles for the forward deflecting surfaces lie within certain comparatively narrow limits for all speeds and all sizes of balloon and for all permissible internal pressures of gas, the saving in friction by use of a shorter, thicker bow for lower speeds being usually of less practical value than the saving in expense for gas loss or envelop material which becomes possible when the sharp cone bow is retained for the lower speeds and the internal gas pressure decreased correspondingly. Hence, I prefer to use practically the same pitch of deflecting surface for a wide range of speeds. For instance, take the practical case of a balloon containing a given volume of gas, adapted to be driven at a definite speed, say 60 miles an hour, and compare the head resistances for varying proportions of bow, the radii and lengths varying in the ratio required for constant volume. With a cone radius of 13 feet and length of 133 feet, the pitch is about 1 in 10. The actual values for an envelop of this pitch, as compared with the values for other cones of equal volume but having a pitch of 1 in 8, 1 in $5\frac{1}{2}$, and 1 in 4, respectively, show very clearly the narrow limits of practically desirable pitch. Some idea of the rate of variation of the head resistance at sixty miles an hour for the various pitches mentioned may be had from the following approximate values given in round numbers.

For the pitch of 1 in 10, the total head resistance is, say, 500 pounds, or about $\frac{1}{2}$ of a pound per square foot of deflecting area, and about 300 pounds of this is skin friction; for 1 in 8, the total is about 640 pounds, or $\frac{3}{4}$ pound per square foot, and 275 pounds of it is skin friction; for 1 in $5\frac{1}{2}$, the total rises to 1280 pounds, or about $1\frac{1}{4}$ pounds per square foot, and only 250 pounds of it is skin friction; while for 1 in 4 the total is 2800 pounds, or about $2\frac{1}{2}$ pounds per square foot, and 225 pounds of it is skin friction. The corresponding horse-powers expended at the bow in overcoming the head resistance for cones of the four ratios mentioned are something like 80 horse-power, 100 horse-power, 200 horse-power, and 450 horse-power, respectively.

As I have previously pointed out, the head pressure due to dynamic reaction at the bow may be in large part recovered at the tail of the balloon, whereas frictional loss is complete, hence it is desirable to reduce the latter so far as may be within limits, and with due regard to safe head pressures per unit area. In the particular case above considered, increasing the pitch causes the total head resistance and horse-power required, as well as the pressure per square foot, to increase in rapid ratio, while the part of the head resistance due to skin friction decreases slowly, and in actual practice increase of pitch to decrease the length and skin friction should not be carried beyond the point where the increasing head pressure becomes excessive. For sixty miles per hour, this is obviously somewhere between the proportions of 1 in 8 and 1 in 4.

The values for other speeds differ from the above approximately as the square of the speed, but with due allowance for this and with due regard for the desirable qualities of rigidity of structure and convenience in maneuvering, anchorage, etc., I have found that for all practically desirable speeds, sizes, and permissible internal pressure of gas, the air deflecting portions of the bow should have a ratio of radius to length lying between the above ratios and preferably between 1 in 5 and 1 in 7, the specific ratio of 1 in 5.5 being more desirable for most purposes, though for especially high speeds the lesser angle of 1 in 6 to 1 in 7 may be found preferable. Where the above considered cones are joined with tail portions consisting of symmetrically arranged cones of similar volume, so that the dynamic loss at the bow is partly recovered at the stern, the 100 horse-power required for the 1 in 8 cone reduces to about 55 horse-power for the complete double cone device of the same pitch, while the 200 horse-power required for the 1 in 5¼ cone is reduced to about 75 horse-power for the double cone. It will be understood that the horse-powers in each case are approximations of the net applied horse-power required to drive the double cone envelop at 60 miles per hour.

The pitch of the cone being as above, the length thereof in any particular case will depend upon the desired volume and lifting capacity of the gas bag, having due regard for the fact that the body portion should be approximately circular in cross-section and in longitudinal section should follow substantially the lines of circles having the straight line elements of the cone tangent thereto at its base. As I have explained, the rear of the cone and the exact curvature of this body portion are not so important as the matter of pitch of the forward deflecting portion, but in general it may be said that the longitudinal curvature of the body portion should be of a radius somewhere between 2 and 5 times the diameter of the base of the cone. A device of this type will be self-sustaining against the air pressure at speeds of sixty or more miles an hour, without any compression member other than gas at an internal pressure, such as is quite permissible with material now obtainable in the market. The envelop requires only a suitable suspension system for distributing the weight of the motor, propellers, etc., constituting the load. The suspension system may comprise a truss for distributing the load and the propeller pull lengthwise of the gas bag, and if desired, such a truss may extend to and form a stay for the points at bow and stern. Such a truss, however, must be comparatively light, and the gas envelop is preferably designed so as to be practically self-sustaining against head pressure, entirely independently of any such truss.

For minimum internal gas pressure or its converse, maximum speeds attainable with a given permissible internal pressure, the stern should be so shaped that the maximum pressure required to be supported by any portion thereof, will be at least as small as any pressure to be supported by any portion of the bow. The use of a gas as an internal compression member is of great advantage, since it is far lighter than any possible wood or metal compression member that could be employed. Where the extreme end is very slender, it may be stayed with supports or battens of wood, metal, whale bone, or otherwise, or it may be formed of fiber board or of cork, and it may consist of a frame work suitably covered, or it may be made solid.

Another feature of my invention involves applying the necessary power to the envelop through such connections that the stresses will be properly distributed and with such relative arrangement of parts that the center of effort will not be too far from the center of resistance.

The use of an internal gas pressure greater than the static pressure, increases the ability of the envelop to withstand pinching in or lateral pressure, and renders possible the sharper convergence of the suspension members which carry the load. This makes it practicable to locate the load quite close to the envelop. A concentrated load, especially when carried close to a relatively long envelop, makes it desirable to employ a relatively rigid girder or truss to receive the load and distribute it along a considerable portion of the length of the envelop. This is especially practicable where the truss is close to the envelop and the envelop itself is of great length as compared with its diameter. The tension members for the truss may depend from a netting or other saddle or series of saddles extending over the top of the gas bag, but one feature of my invention especially concerns a specific suspension arrangement consisting of fabric sewed directly to the gas bag or to a longitudinal flap or pocket formed or secured to the gas bag. If desired, the pocket may contain a longitudinal batten to insure a more minutely uniform distribution of the load along the line of attachment to the gas bag.

Preferably, the truss conforms to the contour of the gas bag sufficiently so that the suspending fabric may inclose part or all of the truss without causing the general contour of the structure to depart much from the regularity of curvature hereinbefore indicated as desirable. By thus inclosing the truss, the windage is greatly decreased.

The truss and its connection to the gas bag should be designed harmoniously with respect to the gas bag so as not to supplant the gas as a thrust member, but rather to supplement the latter in maintaining longitudinal rigidity of the structure.

Another feature of my invention concerns the location of the propeller or the propellers. At the high speeds herein contemplated, their total thrust must necessarily be considerable, notwithstanding the improvements in the contour of the gas bag, and if the propellers are located, as is now the practice, far below the center of resistance, the balloon has a tendency to buck when driven even at very moderate speed. This throws the gas envelop out of alinement with the direction of movement, thereby entailing many serious complications. By my invention, I obviate this to a large extent by locating the center of effort close to the center of resistance, and I effect this not only by locating the motor and the load close to the envelop, but also by locating the propellers well forward, so that they will pull the device rather than push it. This will improve the stability and steering quality, and if the propellers are located near the transverse plane, where the total resistance of the forward portion of the device is equal to or less than that of the after portion, substantially all difficulties of this kind disappear and the device has a natural tendency to run smoothly and to continue in a straight line. This enables me to decrease the size of the rudders, particularly the horizontal rudders, and thereby to correspondingly decrease the friction.

A distinct feature of my invention consists in using a longitudinal truss as the car or load carrying platform.

Another feature consists in locating the truss close to the gas bag and preferably shaping it to conform to a longitudinally curved contour of the latter; also preferably extending said truss throughout a considerable portion of the length of said gas bag and tapering it toward the ends, preferably proportionally to the distribution of the lift and of the load.

Another feature consists in distributing the load in a manner hereafter described, so that the static balance of the device is normally maintained and the truss structure required to carry the load may be of light weight.

Another feature consists of using forward and aft horizontal and vertical rudders having equal and opposite dynamic reactions upon the air, so that when set to counterbalance vertical or lateral deflections the balloon has not dynamic tendency to drift to higher or lower levels, or laterally to one side or the other.

Another feature consists in the use of a differential equalizing gear to insure equality of load on both propellers.

Another feature consists in the use of high speed driving connection or shaft extending from the motor to a point adjacent the propellers, where a speed reducing device is interposed. In this way much lighter and weaker driving connections may be used for transmitting a given amount of power; the instantaneous value of the driving stress being much less.

Another feature of my invention consists in making the projected area covered by the propeller or propellers in their rotation, approximately equal to or greater than the maximum cross-sectional area of the gas envelop. If, then, the widths and pitches of the propeller surfaces are properly designed, the rearward displacement of air by the propellers in order to attain a given speed, will be of relatively lower velocity.

Having thus described the objects and nature of my invention in such manner as will enable those skilled in the art to understand the same and to embody the various features in a practical structure in such manner as to attain a desired degree of the various advantages inherent therein, I will proceed to describe certain illustrative specific devices in which they are advantageously embodied, having reference to the accompanying drawings.

Various mechanical details, such as screws, bolts, rivets, bearings, and mechanical connections for the moving parts of the mechanism and truss, as well as the seams and disposition of the fabric of the envelop, forming no part of my invention, are not specifically shown in the drawings, and it will be understood that these details are to be in accordance with any approved or desired practice.

Figure 9:
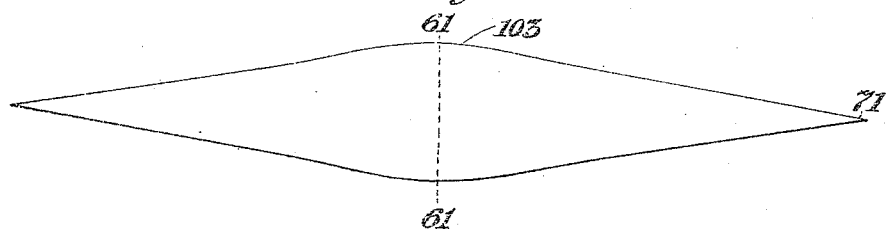
Figure 11:
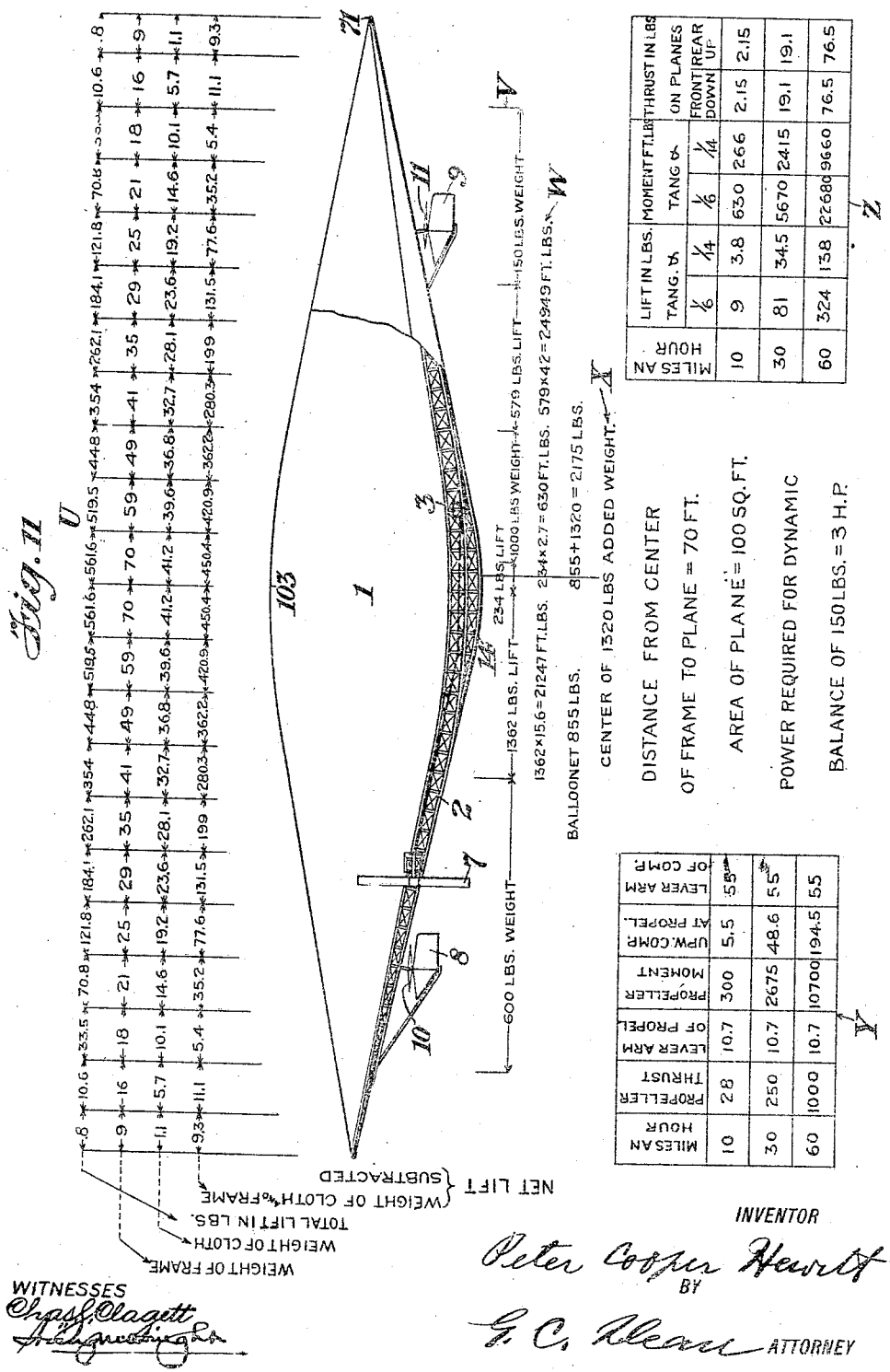
Figure 12:
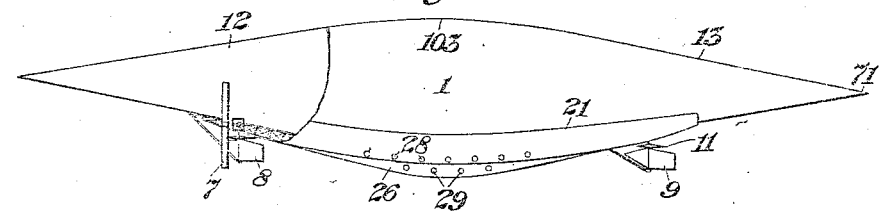
Figure 13:
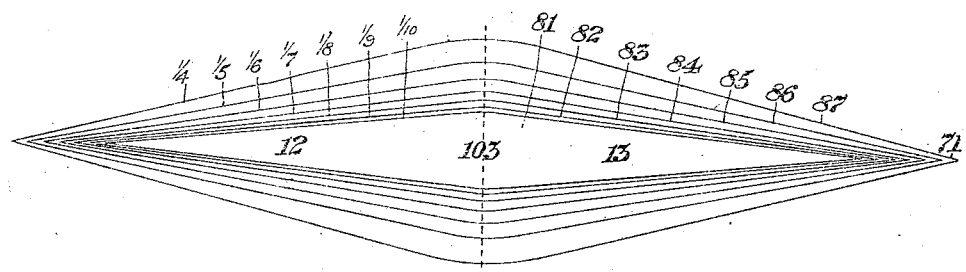

Referring to the drawings: Figure 1 is a side elevation partly broken to show a longitudinal section. Fig. 2 is an end view from the left of Fig. 1. Figs. 1ª and 4ª respectively illustrate means for controlling the vertical and horizontal rudders. Figs. 3, 4, 5, and 6 are respectively side elevation, bottom, top, and stern views of the device showing a modified arrangement of the propellers and supports therefor. Figs. 7 and 8 are respectively side elevation and bow views of the same device with the fabric support for the longitudinal truss broken away. Fig. 9 is an outline of a modified form of gas bag. Fig. 10 is a detail plan view of a differential gear for driving the propellers. Fig. 11 is a side view similar to Fig. 7, accompanied by a diagrammatic projection of tables illustrating a practical distribution of the weights for static balance and of the rudders for dynamic balance. Fig. 12 is a side view showing a modified arrangement of truss. Fig. 13 is a comparative diagram indicating various proportions for the gas bag. Fig. 14 is a partial, transverse, sectional view illustrating means for suspending the truss from the gas bag. Fig. 15 is a partial sectional view of the apparatus shown in Fig. 14 and illustrates means for securing the separate portions of the supporting hammock together and for securing the hammock to the truss.

The balloon comprises a gas bag 1, truss 2, motor 3, transverse supports 4, 5, for propellers 6, 7; forward and aft rudders 8, 9, respectively, and forward and aft balancing planes or horizontal rudders 10, 11 respectively.

The form of gas bag shown in all figures, except 9 and 13, is one in which the converging portions 12, 13 are approximately conical, having a pitch between 1 in 5½ and 1 in 6½, the pitch being reckoned as the effective pitch of the surface acting as a wedge and this is measured by the angle of the surface with respect to the direction of movement, rather than by the angle at which the opposite portions of the exterior surface intersect at the apex. The central portion 103 is formed on a circle of large radius having straight line elements of cones 12, 13 as tangents. The pitch of the cones and the curvature of the body portion are shown as symmetrical with respect to the transverse plane of maximum cross-section. The pitch and curvature and the total length of the structure with respect to its diameter are all predetermined with respect to a high speed to be attained and the proportions shown are approximately such as are suitable for speeds of 50 or 60 miles an hour with an internal gas pressure such as is permissible in connection with gas bag materials now well known in the art. Being designed for high speeds, it is of proper proportions for any lower speed.

The truss 2 is extremely light in construction and is broadened out laterally toward the center, and it is also deepened at 14, and is utilized as the car or load carrying platform. In all of the figures the truss is shown as extending throughout the load carrying portion of the length of the gas bag, and in all figures, except Fig. 12, it is shown as extending to the tip, both forward and aft, so as to form a stay for this portion of the gas bag. This is not essential because the internal pressure of the gas is alone sufficient to sustain the tip.

Within the gas bag is an inner envelop or ballonet stayed in position by connection with the gas bag at 16. The lower end 17 of this envelop is connected to a blower or other desired means for maintaining pressure therein, diagrammatically indicated at 18, Fig. 1. The outer envelop 1, being previously filled with gas and closed against escape thereof, the internal pressure may be regulated by the pressure applied in 15. The latter may contain gas or air, preferably air. If desired, this inner bag 15 may be contained within a second bag 19, of approximately the same dimensions. In such case the total lifting power or levitation of the balloon may be varied by using the space between envelops 15 and 19 for gas, while compressed air only is supplied in 15. Similarly, if desired, gas may be contained in 15 and the space between 15 and 19 may be supplied with the compressed air from the blower. By such means, a desired internal pressure may be maintained within the gas bag sufficient to support the deflecting surfaces against head resistance and also to maintain an approximately circular cross-sectional contour for the gas bag under stress of the load.

Figure 6:
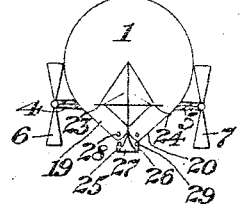
Figure 5:
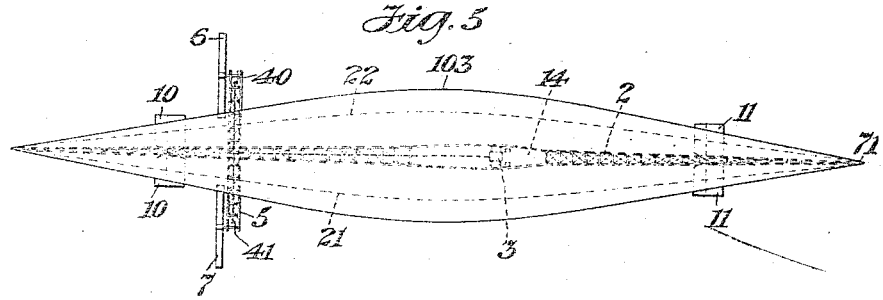
Figure 7:
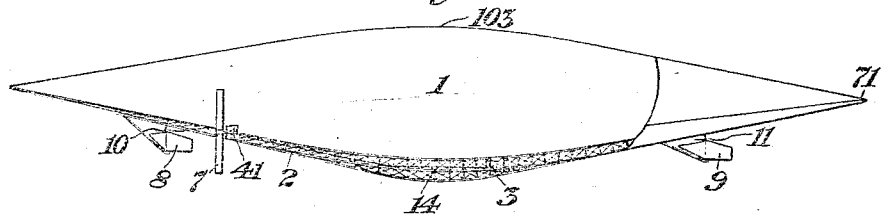

The truss is shown as suspended by a sharply converging fabric 19, 20, secured to the gas bag along the seams 21, 22, which may be reinforced or stiffened by longitudinal battens as indicated at 23, 24, in Figs. 2 and 6, which tend to distribute the stress of the load uniformly.

In Figs. 3, 4, and 12, the fabric is shown as completely closing in the main portions of the truss and the deeper central portion of the truss 14 is shown as closed in by walls 25, 26 and bottom 27. They may be of fabric, though in certain cases part or all of the bottom may be of celluloid, glass or other transparent material or the fabric may be provided with suitably located windows 28, 29, 30. The truss is located close to the gas bag, and is preferably shaped to conform to the longitudinally curved contour thereof, so that the complete closing in by the fabric walls does not greatly vary the symmetry of balance of the device when driven through the air. The car and load platform are substantially comprised within the central portion of the truss and the above described fabric walls. The exhaust of explosive motor 3 discharges through an exterior outlet 30ª, preferably rearwardly directed and located at a point aft of the point of greatest cross-section. The heat of the exhaust may be utilized in any desired way to raise or maintain the temperature of the gas, as by arranging a portion of the exhaust conduit or a branch therefrom near or within the gas bag, or in heating relation to a fluid or solid heat transferring medium. The propellers 6 are located at or near what might be termed the plane of average resistance of the balloon, that is, the plane where the head pressure and friction on the portion of the envelop in advance thereof, are equal to or less than the pressure and friction on portions in the rear thereof, so that the device is pulled rather than pushed through the air.

In the arrangement shown in Figs. 1 and 2 the propellers are located on opposite sides of the envelop at approximately diametrical, equal distances from the center of resistance of the device, so that the resistance and the propelling power efforts have resultants acting equally and oppositely along an axis substantially parallel with the geometrical axis of the structure and practically coincident therewith. The latter purpose might be served by locating the transverse supports 4, 5 at the extreme tip of the balloon, but they may be located aft of that point and inclined upwardly at the requisite angle, as indicated in Figs. 1 and 2. In most cases it is not desirable to locate the propellers too far forward and I prefer to utilize the greater strength and support of the truss 2 at a point a considerable distance aft of the bow, determined by the above described consideration taken in connection with the practical necessity of having the truss of sufficient strength at the point of application of the propelling power.

The propellers are preferably true screw propellers, the fore and aft width of the blades corresponding to portions of a true screw intercepted by two parallel planes; the pitch thereof being determined in accordance with the speed to be attained. In some cases the blades may be concaved on the rear side. The combined areas of the circles covered by the propellers in their rotation and the total cross-section of the air rearwardly displaced thereby, are indicated as approximately equal to the maximum cross-section of the balloon.

As shown, the motor 3 is located far enough aft of the center of the balloon to counterbalance the weight of the supports 4, 5 and propellers 6, 7. The motor is connected to the propellers by shafts 31, 32 having an ordinary cardan joint at 33. Power from this shaft is applied to the transverse shafts 34, 35 by means of a differential equalizing gear, indicated diagrammatically at 36 in Fig. 4, and shown more in detail in Fig. 10. Referring to the latter figure, it will be seen that the shaft 32 is provided with a beveled gear 37, meshing with a similar gear 38 on a rectangular gear case 39, carrying gears 40, 41, meshing with beveled gears 42, 43 on the ends of the shaft 34, 35 respectively. When the torque on shafts 34, 35 tends to become unequal, this arrangement drives one of the shafts faster than the other, so that the work performed by each remains the same. This tends to equalize the draft of the two propellers 6, 7, but is not essential. The power applied to shaft 34, 35 in the manner above described, is transmitted to the propeller shafts through reducing gears at 40, 41. By reducing the speed at the propeller, instead of at the motor, the transmission gear may be smaller and lighter.

The use of relatively large propellers revolving at relatively slow speed in connection with a high speed motor, is an advantage, because of the greater power obtainable from the latter by reason of its high rate and because of the economical application thereof, resulting from the reaction of a large amount of air at relatively low velocity, instead of a relatively small amount of air at high velocity. The propellers are driven in opposite directions so that the torque is balanced.

A practical form for the truss structure is indicated in Fig. 10, where 50, 51 are the main longitudinal members of the truss and 52, 53 are the transverse members. These may be of wood, such as spruce, or of fine quality steel tubes, and are utilized as compression members, the tension stresses being mainly taken by the wires 54, 55, which may be of fine quality, such as piano wire.

While the diametrical relation of propellers with respect to the gas bag, as shown in Figs. 1 and 2, is desirable by reason of the perfect dynamic balance, there are practical objections to the structural features necessary to locate them in this position, and I prefer to use the straight transverse truss shown in the other figures of the drawing, this truss being located sufficiently far forward so that the axes of the propellers are well above the lowermost portion of the gas bag, preferably at a point where its diameter is much reduced and yet not too far forward. In this way the horizontal plane of the axes of the propellers may pass close enough to the center of resistance, so that the dynamic balance of the craft when under way can be maintained by relatively small planes or horizontal rudders.

The balancing planes for correcting unsymmetrical dynamic efforts, should be of peculiar location and type, so that when set reversely they constitute what might be termed a vertically acting dynamic couple, the action of the planes being approximately equal and their location such that when the balloon is in motion, the upward thrust on the rearward plane is equal to the downward thrust on the forward plane, so that the resultant effect is solely a fore and aft torsion free from any other resultant effect. The total fore and aft tilting efforts of this couple should just balance any tilting effect of the propellers when under way. The dynamic tendency of the device to tilt when under way, could be corrected by a balancing plane deflecting air downwardly at the rear only or by one deflecting the air upwardly at the bow only, but either of these alone and not acting as a couple in accordance with my invention, would necessarily cause the balloon to drift from its normal level, in one case upwardly from that level and in the other case downwardly.

In actual practice, it is extremely difficult to get the pitches, areas, and effective draft of the two propellers precisely the same. When the draft is unequal, the rudder surface necessary to correct the inequality may be considerable, and, moreover, unless the correction is made by means of vertical rudders forming a horizontally acting dynamic couple, designed in accordance with the principles just described for the vertically acting dynamic couple, the effect will be to cause the balloon to drift to one side or the other, similarly to the up or down drift previously referred to.

The location of the vertical rudders so that they may be used for this purpose, constitutes one feature of my invention, but I prefer to minimize the rudder effort necessary for this purpose by insuring equal loads on the propellers, and I do this by use of the differential gear between the driving shaft and the sections of the propeller shafts, which causes the rotating effort or load on each to be the same, and hence their propelling effects as near equal as possible.

In order to construct successful balloons having a relatively long gas bag adapted for high speeds, it is desirable to distribute the load longitudinally of the envelop in approximate proportion to the displacement and lifting power of the envelop at or near the cross-section where each portion of the load is found, so as to lessen the supporting strain on various portions of the truss and thereby lessen the massiveness and weight required for this member. It is necessary to lump various portions of the load more or less, but this may be done with such due regard for proportional distribution of the lumps with respect to the lifting power that the total static balance with respect to the center of lift of the gas bag will be symmetrical and undisturbed.

In Fig. 11 I have indicated by a graphic diagram the manner in which this may be done. In this diagram, the projected longitudinal values for weights of cloth and of frame and for total lift of the gas, as well as for net lift obtained by subtracting one from the other, are indicated in table U. The distribution of weights of rudders, propellers, motor, etc., are projected at V. These weights multiplied respectively by the distances of their effective leverages are indicated at W. The center and estimated amount of added weight, including what might be called the transient load, are indicated at X. The dynamic tilting effects due to the location of the propeller below the center of resistance are indicated for speeds of 10, 30, and 60 miles an hour in table Y. The balancing and correcting effects of the dynamic couple formed by the rudders 10 and 11 are worked out for the same speeds and for opposite angular adjustments represented by pitches of 1 in 6 and 1 in 14, and are indicated in table Z. Between the tables Y and Z are the specifications for location, area, etc., of said balancing planes 10, 11. The power consumed in maintaining the dynamic balance is indicated as 3 horsepower at a speed of 60 miles per hour. From this diagram it will be seen that the weights of cloth and truss are almost perfectly distributed and that the lumped weights of the rudders and balancing planes are taken care of very nearly in their own cross-sections. The lumped weight of the propellers at a considerable distance from the center, is balanced by the heavier motor on the opposite side of the center and at a shorter distance therefrom. By these various expedients, I am able to achieve one of the chief objects of this invention, which is to produce a dirigible balloon in which all static and dynamic efforts not substantially parallel with the direction of movement and with the axis of the device are balanced within the device.

In certain cases where the balloon tends to rise or fall more than desired, the dynamic tilt may be corrected by the forward rudder alone, so as to give a downwardly tending drift when it is desired to make the balloon tend downward, or by the rear rudder alone, so as to give an upwardly tending drift when it is desired to make the balloon tend upward, but any excessive drift tending to unbalance the symmetry of impingement and pressure of the air on the bow, should be avoided.

In Fig. 12 I have shown the truss as extending along the central portion of the length of the gas bag only. In this case the conical bow and stern are not stayed by the truss, the sole support being afforded by the internal pressure of the gas acting as the compression member while the walls of the envelop act as the tension member. The propellers and rudders are nearer the center of the structure than in the forms shown in the other figures.

In practice, it is desirable to use only as much internal gas pressure as necessary, and I prefer to proportion the pressure to the speed. If the blower 18 is of proper capacity and is actuated by the propeller shaft, the pressure will increase with the speed and will fall when the propellers stop.

Fig. 9 diagrammatically indicates the gas bag as having the general contour of two concaved cones joined at the base by convex curves forming continuations of the curved line elements of the concaved cones, so that the contour taken lengthwise of the device consists of a concaved curve, which will engage the air and displace the same at a certain rate. The convex curvature corresponds to the decrement of the velocity imparted by the deflecting surfaces, so that the air will be approximately in a state of rest by the time it reaches the central transverse plane 61, 61. From this point, the air in a state of rest will acquire new velocity corresponding to the decrease in diameter of the curve from 61, 61 rearwardly, and this inward velocity will be checked by taking effect on the long tapered tail, which will absorb the energy of inward movement and leave the air substantially in a state of rest after the passage of the tip 71.

The modified form of forward deflecting surfaces indicated in Fig. 9 may be used in connection with the features shown in any of the other figures.

In Fig. 13 I have shown seven different proportions of length and diameter which are well within the range of useful application for various special purposes or conditions, and any of these proportions may be applied for the gas bags shown in the other figures and the deflecting surfaces may be true cones or may be concaved longitudinally, as hereinbefore indicated. They may be used in connection with body portions curved on the radii indicated, or on other radii, or substantially similar shapes, and any of the deflecting surfaces indicated may be used for the bow of a balloon having any known or desired form of body portion or tail. In Fig. 13 the pitch of the surfaces and the ratios of diameters to total lengths are as follows: in the outer contour 81, it is 1 to 4; in 82, it is 1 to 5; in 83, it is 1 to 6; in 84, it is 1 to 7; in 85, it is 1 to 8; in 86, it is 1 to 9; in 87, it is 1 to 10. In all these cases, the radius of longitudinal curvature of the body portion is about equal to the diameter of the gas bag, but this may be greater or less in certain cases, as has been explained.

It will be obvious that the principles whereby I determine the longitudinal contour of the point, body portion, and tail of my balloon are applicable where any or all of these portions have a cross-section whose outline is not a true circle. The varying angles of the surface and their radial distances from the axis, taken along any longitudinal radial section, may be given the required relation with sufficient degree of approximation, even where the cross-sectional outline is somewhat oval, polygonal, scalloped, or other shape, provided the rate of variation of said factors is preserved for all longitudinal sections normal to each surface and parallel with the axis, so as to attain the pressure results hereinbefore explained. In all cases, however, a circular or oval outline is preferable.

While I have herein fully shown and described, and have pointed out in the appended claims certain novel features of construction, arrangement, and operation which characterize my invention, it will be understood by those skilled in the art that various omissions, substitutions, and changes in the forms, proportions, sizes, and details of the device and of its operation, may be made without departing from the spirit of my invention.

I claim:

1. A motor balloon comprising an elongated envelop, in combination with a load supporting truss located close to the envelop, propellers located at equal distances from, and on opposite sides of, the envelop and between the horizontal plane of the load and the plane of the center of resistance, means for balancing the operative effect of said propellers and two similar deflecting surfaces of substantially equal areas located one forward and the other aft in such relation, as to exert equal and opposite deflecting efforts for the purpose described.

2. A motor balloon comprising an elongated envelop, in combination with a truss supporting the load close to the envelop, and balanced propellers located between the horizontal planes of said load and of the center of resistance respectively and having the unbalanced dynamic effect of the propellers balanced by means of rudders which serve to create a dynamic couple operating in a vertical plane.

3. In a dirigible balloon, a gas bag comprising a longitudinally tapered envelop, a load carrying truss, conforming in contour to the longitudinally contour of the envelop, propellers carried by said truss, and located between the horizontal plane of the load and the horizontal plane of the center of resistance of the balloon and at or near the vertical plane of the center of resistance of the balloon, means for varying the speed of the propellers to balance their operative effect and means for balancing the unbalanced dynamic effect of the propellers in a horizontal and vertical plane without causing the balloon to drift.

4. In a dirigible balloon, a gas bag, comprising an envelop having a longitudinally tapered head in which the maximum pressure developed by the forward movement of the balloon is uniform over a large portion of its surface, auxiliary means for supporting the tip of said head, means for maintaining an internal pressure greater than the head pressure on said gas bag when the latter is traveling at full speed, separate propellers adjacent opposite sides of said gas bag and means for balancing the thrust of said propellers.

5. In a dirigible balloon, a gas bag comprising an envelop having a longitudinally tapered head in which the maximum pressure developed by the forward movement of the balloon is uniform over a large portion of its surface, auxiliary means for supporting the tip of said head, means for maintaining an internal pressure greater than the head pressure on said gas bag when the latter is traveling at full speed, a motor, separate propellers driven thereby and disposed adjacent opposite sides of said gas bag, and differential gearing connecting said propellers.

6. In a dirigible balloon, a gas bag comprising an envelop having a longitudinally tapered head in which the maximum pressure developed by the forward movement of the balloon is uniform over a large portion of its surface, auxiliary means for supporting the tip of said head, means for maintaining an internal pressure greater than the head pressure on said gas bag when the latter is traveling at full speed, separate propellers adjacent opposite sides of said gas bag, and means for varying the relative speeds of the propellers to balance their operative effects and insure point-on movement.

7. In a dirigible balloon, a gas bag comprising an envelop having a pointed head in which the maximum pressure developed by the forward movement of the balloon is uniform over a large portion of its surface, auxiliary means for supporting the point of said head, means for maintaining an internal pressure greater than the head pressure on said gas bag when the latter is traveling at full speed, separate propellers adjacent opposite sides of said gas bag, means for varying the relative speeds of the propellers to balance their operative effects, and means for balancing the unbalanced dynamic effect of the propellers in horizontal and vertical planes without causing the balloon to rift.

8. In a dirigible balloon, a gas bag comprising an envelop having a longitudinally tapered head in which the maximum pressure developed by the forward movement of the balloon is uniform over a large portion of its surface, auxiliary means for supporting the tip of said head, means for maintaining the internal pressure greater than the head pressure on said gas bag when the latter is traveling at full speed, separate propellers adjacent opposite sides of said gas bag, means for varying the relative speeds of the propellers to balance their operative effects, and a pair of rudders located one forward and the other aft in such relation to the structure as to produce equal and opposite turning effects.

Signed at New York city, in the county of New York and State of New York this seventeenth day of April, A. D. 1908.

PETER COOPER HEWITT.

Witnesses:
    IRVING M. WRIGHT,
    HUGO CENTEWALL.